United States Patent [19]

Lycett

[11] Patent Number: 5,094,485
[45] Date of Patent: Mar. 10, 1992

[54] RETRACTABLE SELF-LATCHING LOCKING PIN ASSEMBLY

[75] Inventor: Peter Lycett, West Midlands, United Kingdom

[73] Assignee: Multi-Stroke Handbrake Controls Limited, Tewkesbury, United Kingdom

[21] Appl. No.: 669,369

[22] Filed: Mar. 14, 1991

[51] Int. Cl.⁵ .............................................. B60P 7/00
[52] U.S. Cl. ..................................... 292/143; 292/152
[58] Field of Search .............. 292/143, 161, 173, 177, 292/188, DIG. 58, 152; 74/526, 523

[56] References Cited

U.S. PATENT DOCUMENTS

| | | | |
|---|---|---|---|
| 335,024 | 1/1886 | Felmlee | 292/143 |
| 1,215,752 | 2/1917 | Walraven | 292/143 |
| 2,031,725 | 2/1936 | Mellor | 292/173 |
| 3,350,957 | 11/1967 | Morse | 74/523 X |
| 4,954,029 | 9/1990 | Durkin | 292/143 X |

*Primary Examiner*—Richard E. Moore
*Attorney, Agent, or Firm*—Ratner & Prestia

[57] ABSTRACT

A locking pin assembly for locking an end of a cargo container onto the container-carrying platform of a transport vehicle. The assembly has a retractable locking pin movable between a fully rearwardly extended container-locking position and a fully forwardly retracted container-freeing position. The locking pin is movable between these two positions by manually swinging a pivoted operating lever which extends through a longitudinally elongated U-shaped slot in a rigidly immovable latching gate. A bias spring urges the operating lever into the ends of the U-shaped slot to latch the lever and hence latch the locking pin in the absence of manual pressure on the lever. De-latching of the operating lever and locking pin is accomplished by a single-handed operation involving merely pressing down on the lever, with de-latching being automatic on releasing the lever.

A separate manual operation of the latching gate is not required, and being rigidly immovable, the latching gate cannot be dislodged by jolting of the transport vehicle.

8 Claims, 3 Drawing Sheets

5,094,485

RETRACTABLE SELF-LATCHING LOCKING PIN ASSEMBLY

INTRODUCTION

This invention relates to a retractable self-latching locking pin assembly, and relates more particularly but not exclusively to a manually retractable locking pin assembly for locking an end of a cargo container on the container-carrying platform of a cargo container transport vehicle.

BACKGROUND OF THE INVENTION (1) Field of the Invention

It is customary for ISO (International Standards Organisation) containers to have standard corner fittings by which the containers are latched to the container-carrying platforms of transport vehicles by means of twist-locks which enter the corner fittings from beneath. However, such twist-locks depend beneath the container-carrying platform of the vehicle and accordingly require a suitable clearance beneath the platform.

(2) Description of the Prior Art

Proposals have been made for twist-lock alternatives to be used at the front of container-carrying vehicle platforms, such alternatives being mounted in, and operating in, a generally horizontal plane such as to obviate the need for vertical clearance beneath the platform. To obviate excessive first cost, such twist-lock alternatives are relatively simple mechanical arrangements which are manually operated. One such arrangement includes a horizontally retractable locking pin coupled to a manual operating lever. For reasons of safety, the locking pin has to be latched to its extended container-locking position. This prior art arrangement has a vertically swingable latch which engages the operating lever to hold the lever, and hence hold the locking pin in its extended position. However, to unlatch and re-latch the operating lever, the latch requires manual operations distinct from the manual operation of the pin-operating lever, and the prior-art arrangement therefore requires two distinct and co-ordinated manual operations. Moreover, the swingable latch of this prior art arrangement depends on the affect of gravity on the latch to hold the operating lever latched during container-transporting vehicle movements. Thus, not only does the latch require manual resetting into its lever-latching position, jolting of the vehicle during transport can dislodge the latch, so freeing the locking pin and potentially allowing the dangerous situation of the container becoming unlocked from the transport vehicle.

OBJECTS AND BRIEF SUMMARY OF THE INVENTION

It is a primary object of the invention to provide a retractable self-latching locking pin assembly capable of locking an end of a cargo container onto the container-carrying platform (or equivalent structure) of a cargo container transport vehicle against lateral and vertical movement relative thereto, the locking pin assembly not requiring vertical clearance beneath the container-carrying platform of said vehicle, said locking pin assembly being operable by a single-handed manual operation.

It is a secondary object of the present invention to provide a retractable self-latching locking pin assembly having a manually operable operating lever operatively coupled to a locking pin of said locking pin assembly such that said locking pin is selectively bi-directionally movable by manual operation of said operating lever, said locking pin being movable by manual operation of said operating lever between a first, extended container-locking position and a second, retracted container-freeing position, and vice versa, said locking pin assembly further having a latching means coupled to and co-operating with said operating lever to latch and retain said operating lever in either one of two positions respectively corresponding to said first and second positions of said locking pin in the absence of a manual operating force on said operating lever, the mutual coupling of said latching means and said operating lever being such that said latching means is defeated to de-latch and release said operating lever by means of a preliminary movement of said operating lever manually induced by said manual operation of said operating lever.

It is a subsidiary object of the present invention to provide a retractable self-latching locking pin assembly wherein said latching means is a latching gate forming a rigidly immovable part of said assembly, said operating lever being mounted for pivoting movement substantially in a plane including said first and second positions of said locking pin, said operating lever also being mounted for limited movement transverse said plane, the limits of said transverse movement of the operating lever being defined by the mutual coupling of the latching gate and the operating lever, said locking pin assembly further including a spring bias means effective on said operating lever to bias said operating lever to the latched and retained position thereof in relation to said latching gate, said spring bias means being overcome by said preliminary movement of said operating lever.

It is a further object of the present invention to provide a locking pin assembly in which said latching gate encompasses said operating lever positively to prevent movement thereof outside limits predetermined by the dimensions of said gate.

It is an additional object of the invention to provide a cargo container transport vehicle having a cargo container carrying platform or equivalent structure in combination with a retractable self-latching locking pin assembly as aforesaid, said assembly being mounted on said vehicle to selectively lock an end of a container thereon. The vehicle preferably comprises two such locking pin assemblies each mounted thereon to selectively lock a respective bottom corner of the container.

BRIEF DESCRIPTION OF THE DRAWINGS

An embodiment of the invention will now be described by way of example, with reference to the accompanying drawings wherein.

DETAILED DESCRIPTION OF THE INVENTION

Figure 1:
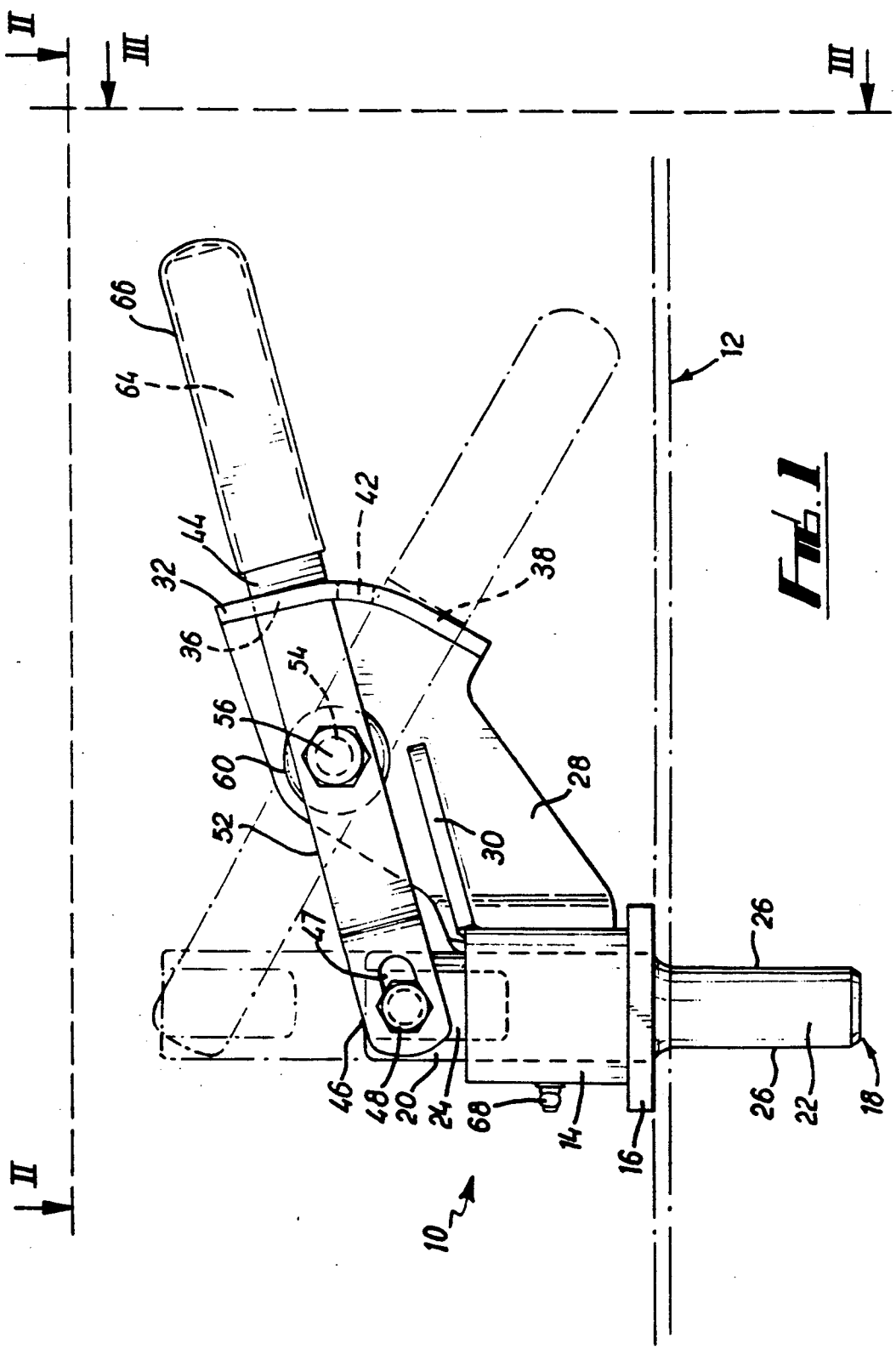
FIG. 1 is a plan view from above of the embodiment.

Referring to the drawings, FIG. 1 is a plan view from above of an embodiment 10 of a retractable self-latching locking pin assembly in accordance with the invention. FIG. 1 shows the assembly 10 in its working position secured to and projecting forwardly of the front bolster 12 of the container-carrying platform of a conventional cargo container transport vehicle (not otherwise shown). The bolster 12 is schematically depicted in ghost outline in FIG. 1, and is omitted from FIGS. 2 and 3 for clarity. The bolster 12 is essentially a vertical front edge of the vehicle platform which prevents further forward motion of a cargo container (not shown) in contact with the bolster 12. The locking pin assembly prevents sideways and upwards movement of the adjacent end of the cargo container, in manner now to be detailed.

The locking pin assembly 10 comprises a hollow cylindrical body 14 with an integral flange 16 at its rear end by means of which the assembly 10 is secured to the leading face of the bolster 12, preferably by being welded thereto (or alternatively by means of bolts (not shown) passing through the flange 16 and the bolster 12). The bore of the hollow cylindrical body 14 is substantially horizontal and aligned in the forward and rearward direction of the vehicle (respectively up and down within the plane of FIG. 1, vertically up out of and down into the plane of FIG. 2, and right and left in FIG. 3, as viewed therein).

The body 14 slidably mounts a locking pin 18 for substantially horizontal fore and aft movement relative to the bolster 12 and the rest of the vehicle. The locking pin 18 has an axial length substantially greater than the axial length of the body 14, such that in the fully rearwardly extended position of the locking pin 18 as shown in full outline in FIG. 1, the front end 20 of the locking pin 18 projects forwardly of the body 14 and the rear end 22 of the locking pin 18 projects rearwardly of the body 14, there being a suitably sized hole in the bolster 12 behind the flange 16 to allow the pin rear end 22 to pass therethrough. The overall shape of the locking pin 18 is cylindrical, with a pair of horizontal flats 24 on the upper and lower sides of the front end 20, and a pair of vertical flats 26 on the left and right sides of the rear end 22.

A pressed bracket 28 extends rightwards from the body 14 (rightwards as viewed in FIG. 1 and leftwards as viewed in FIG. 2), and is reinforced against unwanted bending by means of a welded-on web 30 between the body 14 and the bracket 28. The outboard (right-hand) end of the bracket 28 is integrally formed as an upturned arcuate (in plan; see FIG. 1) latching gate 32 having a slot 34 shaped as a longitudinally extending "U". Opposite end regions 36 and 38 of the U-shaped slot 34 have a relatively large vertical height (through small relative to the longitudinal separation of the opposite ends of the slot 34), while the central region 40 of the slot 34 is vertically narrowed to a relatively small height (in comparison to the heights of the end regions 36 and 38) by means of a vertically depending latch projection 42. The function of the latching gate 32 will be explained below with reference to the operation of the locking pin assembly 10.

Figure 2:
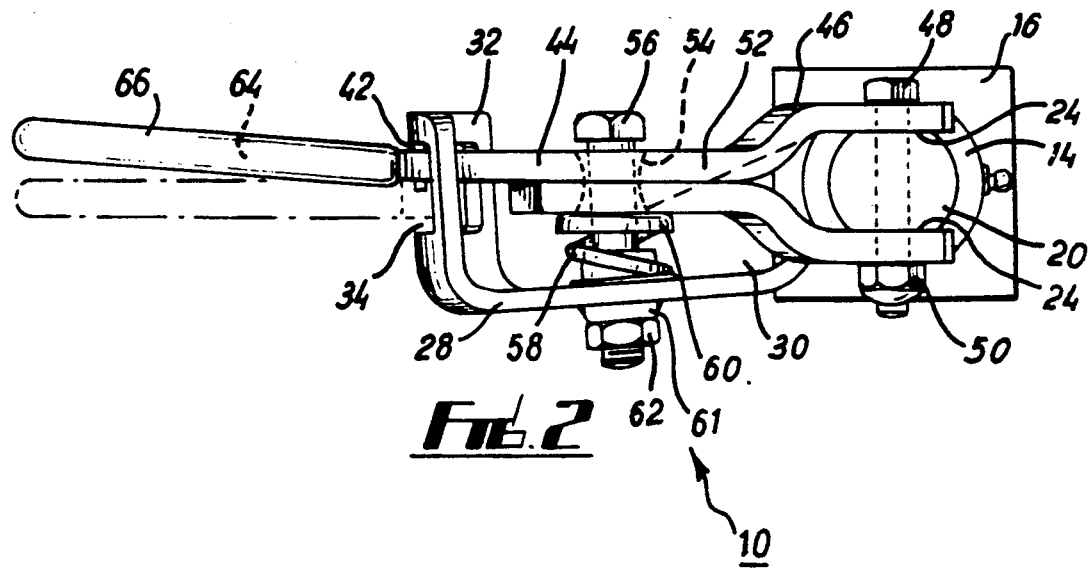
FIG. 2 is a horizontal front view of the embodiment, taken on the line II—II in FIG. 1.

The locking pin assembly 10 further comprises an elongate manual operating lever 44 whose inner end 46 is bifurcated and cranked to fit over the flats 24 on the forward end 20 of locking pin 18, as particularly shown in FIG. 2. The inner end 46 of the lever 44 is pivotally coupled to the pin forward end 20 by means of a pivotal coupling bolt 48 passing through a laterally narrow and longitudinally elongate pivot slot 47 in the lever end 46. The bolt 48 is retained by a lock-nut 50.

The double-thickness center 52 of the lever 44 is formed with a pivot hole 54. A pivot bolt 56 is secured to and upstanding from the bracket 28 to pass through the hole 54, thereby pivotally coupling the manual operating lever 44 to the bracket 28 and hence to the static part of the assembly 10. A compression spring 58 is located around the pivot bolt 56 between the bracket 28 and the lever 44. The lower end of the spring 58 bears against the upper surface of the bracket 28, while the upper end of the spring 58 bears against the underside of the lever center 52 through an interposed cup washer 60. The pivot bolt 56 is retained by a mutually locking nut 62 which engages a boss 61 formed on the bracket 28. The functional reason for the longitudinal elongation of the pivot slot 47 and the function of the spring 58 will be explained below with reference to the operation of locking pin assembly 10.

Between the lever center 52 and an outer end 64 longitudinally remote from the pivoted inner end 46, the operating lever 44 passes through the U-shaped slot 34 of the latching gate 32. The outer end 64 of the operating lever 44 extends beyond the latching gate 32 by a distance not less than enables the end 64 to be easily manually grasped by an operator of the apparatus 10, such grasp being facilitated by fitting the lever end 64 with a plastics cover 66.

Operation of the locking pin apparatus 10 will now be described.

In FIG. 1, the rearwardly extended container-locking position of the locking pin 18 is shown in full outline, while the forwardly retracted container-freeing position of the locking pin 18 is shown in chain-dash ghost outline. In the fully extended position, the pin rear end 22 enters a suitable hole or cavity in one end of the cargo container (not shown) or a fitting thereon, for example a conventional twist-lock fitting such as to secure that end of the container against sideways and upward movement. The bolster 12 prevents forward movement of the container, while rearward movement of the container is prevented by anchoring the rear end of the container by a suitable fastener, for example a twist-lock. In the fully retracted position, the pin rear end 22 is preferably flush with or beneath the rear face of the bolster 12 although it may also project slightly.

The locking pin 18 is moved from the rearwardly extended container-locking position to the forwardly retracted container-freeing position by manually swinging the operating lever 44 from its anti-clockwise position shown in FIG. 1 in full outline, to its clockwise position shown in FIG. 1 in chain-dash ghost outline to correspond to the convention employed to depict these two positions of the locking pin 18. Swinging movement of the lever 44 is coupled to the locking pin 18 and its forward end 20 by means of the pivotal coupling bolt 48. Sliding movement of the locking pin 18 in the bore of the body 14 is facilitated by lubrication applied through a grease nipple 68 secured in the left side of the body 14.

During its swinging movement, the operating lever 44 pivots about the static central pivot bolt 56 upstanding from the bracket 28, the pivot bolt 56 acting as a fulcrum for the lever 44. Because the locking pin 18 is constrained by the body 14 to move in a straight line, whereas the lever end 46 is constrained to move in an arcuate line by the pivot hole 54 engaging the pivot bolt 56, the lever end 46 varies its separation from the pivotal coupling bolt 48; the longitudinal elongation of the pivot slot 47 accommodates this transitional variation in separation of lever end 46 from the movement axis of the locking pin 18.

The above-described movement of the locking pin 18 is not achieved solely by swinging the operating lever 44, because the latching gate 32 holds the lever 44 latched in each of the two positions corresponding to the extended and retracted positions of the locking pin 18. In the anti-clockwise position of the lever 44 (shown in FIG. 1 in full outline, and corresponding to the fully rearwardly extended container-locking position of the locking pin 18) the compression spring 58 biasses the lever center 52 upwards to bring the lever 44 upwards within the forward end region 36 of the slot 34 in the latching gate 32 where the lever 44 is latched between the forward end of the slot 34 and the depending latching projection 42. Correspondingly, in the clockwise position of the lever 44 (shown in FIG. 1 in chain-dash ghost outline, and corresponding to the fully forwardly retracted container-freeing position of the locking pin 18) the compression spring 58 biasses the lever center 52 upwards to bring the lever 44 upwards within the rear end region 38 of the slot 34 in the latching gate 32 where the lever 44 is latched between the rear end of the slot 34 and the depending latching projection 42.

Thus, in order to swing the lever 44 between one and the other of its two aforementioned pivotal positions, it is first necessary to swing the outer end 64 of the lever 44 downwards from the upward position shown in full outline in FIG. 2 to the lower position shown in chain-dash ghost outline in FIG. 2 in order to come below the lower end of the depending latching projection 42, whereafter the lever 44 can be swung horizontally from one end of the slot 34 to the other end of the slot 34. However, this necessary preliminary de-latching operation can be simply performed single-handed by downward manual pressure on the lever end 64 prior to horizontal movement of the lever end 64 to cause the locking pin 18 to move from one to the other of its two positions. No manual operation on any other part of the assembly 10 is necessary to cause de-latching. When the lever 44 has been swung to its desired position, re-latching occurs automatically simply by releasing the lever end 64, whereupon the bias spring 58 pushes up the lever center 52 to cause the lever 44 to re-enter the corresponding one of the slot end regions 36 and 38, thereby again to become latched against movement in the absence of manual pressure on the lever end 64. The relatively small vertical pivoting movements of the lever 44 during de-latching and re-latching (distinct from the relatively large horizontal pivoting movements of the lever 44 during extension and retraction of the locking pin 18) are accommodated by the cylindricalities of the pin 18 and of the pin-mounting bore of the body 14 which allow such vertical pivoting movements. Excess movements of the operating lever 44 (either horizontally or vertically) are absolutely prevented by the latching gate 32 completely encompassing the lever 44.

Thus, the present invention provides a mechanically simple and robust retractable self-latching locking pin assembly 10 in which the latching gate 32 has no moving parts per se, in which de-latching is a single-handed 'press and slide' manual operation forming a preliminary part of manual extension and retraction of the locking pin 18 by swinging the manual operating lever 44, and in which re-latching is automatically achieved in the absence of manual pressure on the operating lever 44. The absence of moving parts in the latching gate 32 per se ensures a greater operational reliability and safety of the locking pin assembly 10 compared to the prior art arrangement employing a gravity-actuated swingable latch.

Figure 3:
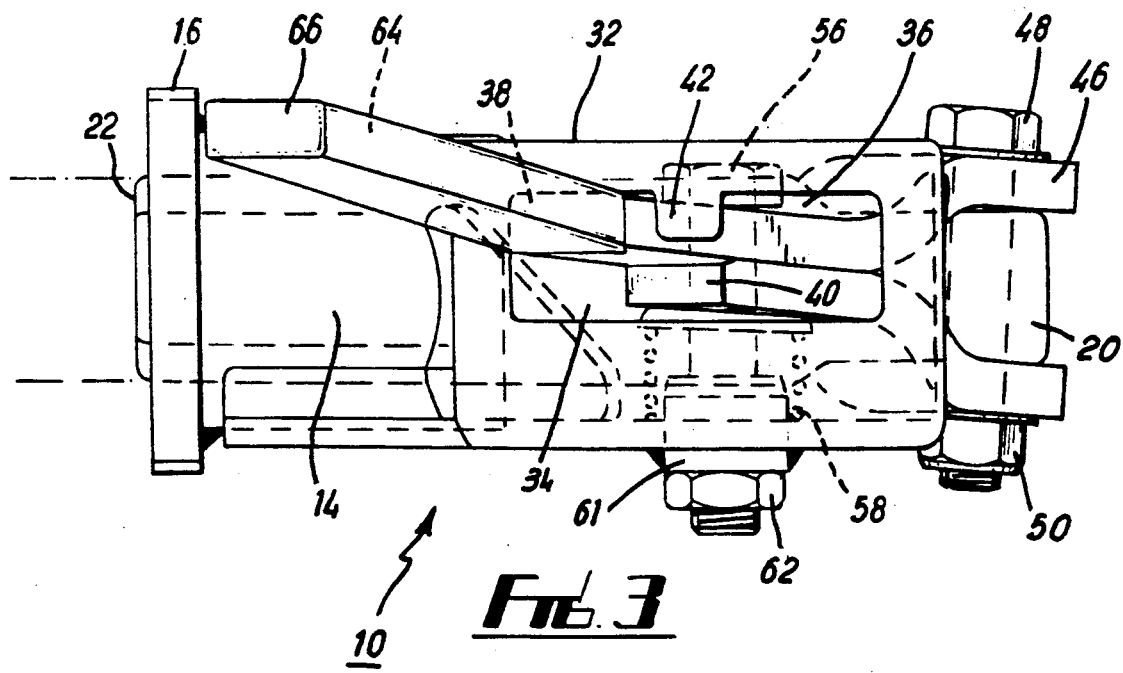
FIG. 3 is a horizontal side view of the embodiment, taken on the line III—III in FIG. 1.
Figure 4:
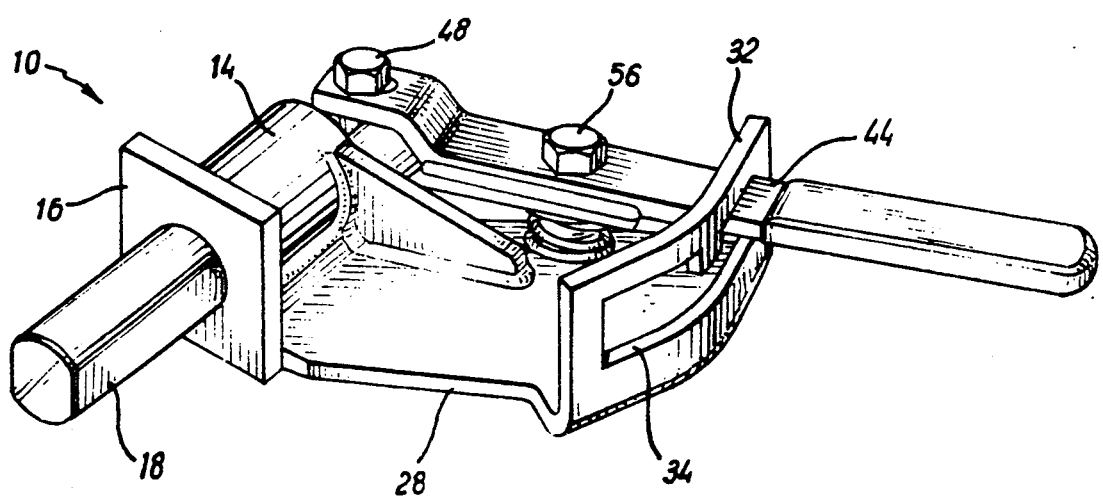
FIG. 4 is a perspective view of the embodiment, from above and to the rear of the embodiment.

The locking pin assembly 10 as shown in FIGS. 1-3 may be employed on its own to selectively lock the end of a cargo container to the bolster 12, and hence on to the container-carrying platform of the container transport vehicle. However, it is preferred to use two such locking pin assemblies, one being mounted at each side of the bolster 12 so as to selectively lock a respective bottom corner of the container to each side of the bolster 12, and hence on to the container-carrying platform of the container transport vehicle. As shown in FIGS. 1-3, the locking pin assembly 10 is specifically designed for use as the right side locking pin assembly in such a preferred twin locking pin assembly arrangement, the left side locking pin assembly being either the illustrated locking pin assembly vertically inverted to have the operating lever thereof projecting laterally outwards of the transport vehicle, or more preferably the left side locking pin assembly is a lateral mirror image of the illustrated locking pin assembly (i.e. the illustrated locking pin assembly 10 as viewed in a vertical mirror to one side thereof).

While certain modifications and variations have been described above, the invention is not restricted thereto, and other modifications and variations can be adopted without departing from the scope of the invention as defined in the appended claims.

We claim:

1. A retractable self-latching locking pin assembly capable of locking an end of a cargo container onto the container-carrying platform or equivalent structure of a cargo container transport vehicle against lateral and vertical movement relative thereto, said assembly comprising a bi-directionally movable locking pin, said assembly further comprising a manually operable operating lever operatively coupled to said locking pin such that said locking pin is selectively bi-directionally movable by operation of said operating lever between a first, extended, container-locking position and a second, retracted, container-freeing position, and vice versa, said assembly additionally comprising a latching means coupled to and co-operating with said operating lever to latch and retain said operating lever in either one of two positions respectively corresponding to said first and second positions of said locking pin, the mutual coupling of said latching means and said operating lever enabling said latching means to be defeated to de-latch and release said operating lever by means of a preliminary movement of said operating lever manually induced by said manual operation of said operating lever, wherein said latching means is a latching gate forming a rigidly immovable part of said apparatus, said operating lever being mounted for pivoting movement substantially in a plane including said first and second positions of said locking pin, said operating lever also being mounted for limited movement transverse said plane, the limits of said transverse movement of the operating lever being defined by the mutual coupling of the latching gate and the operating lever, said assembly further including a spring bias means effective on said operating lever to bias said operating lever to the latched and retained position thereof in relation to said latching gate, said spring bias means being overcome by said preliminary movement of said operating lever, wherein said assembly comprises a hollow tubular body slidably mounting said locking pin therein, said assembly further comprising a bracket rigidly attached at one end thereof to said tubular body and extending laterally therefrom to mount said latching gate at the other end thereof.

2. An assembly as claimed in claim 1, wherein said latching gate encompasses said operating lever positively to prevent movement thereof outside limits predetermined by the dimensions of said gate.

3. An assembly as claimed in claim 1, wherein said latching gate is an upstanding member at said other end of said bracket, said upstanding member having a longitudinally elongate U-shaped slot therein defining said latching gate.

4. An assembly as claimed in claim 3, wherein said U-shaped slot is continuously surrounded by said upstanding member and said operating lever projects through said U-shaped slot positively to prevent movement of said operating lever outside limits predetermined by the dimensions of said U-shaped slot.

5. An assembly as claimed in claim 4, wherein said longitudinally elongate U-shaped slot comprises opposite end regions of relatively greater height separated by a central region of relatively lesser height defined by a depending latching projection.

6. An assembly as claimed in claim 1, wherein a pivot member projects from said bracket as a fulcrum for pin-operating swinging movement of said operating lever.

7. An assembly as claimed in claim 6, wherein said spring bias means is a coiled compression spring encircling said pivot member between said bracket and said operating lever to exert said spring bias on said operating lever.

8. An assembly as claimed in claim 6, wherein said locking pin and said operating lever are pivotally coupled by a pivotal coupling member, said operating lever comprises a longitudinally elongated slot and said pivotal coupling member projects through said elongated slot, the longitudinal elongation of said slot permitting longitudinal movement of said operating lever relative to said pivotal coupling member.

* * * * *